United States Patent
Hill et al.

(10) Patent No.: US 8,084,120 B2
(45) Date of Patent: Dec. 27, 2011

(54) COMPOSITE MATERIALS AND THEIR USE

(75) Inventors: Samuel Jestyn Hill, Wrexham (GB);
Emiliano Frulloni, Wrexham (GB);
Carmelo LoFaro, Gresford (GB); Robin Maskell, Phoenix, AZ (US)

(73) Assignee: Cytec Technology Group, Wilmington, DE (US)

( * ) Notice: Subject to any disclaimer, the term of this patent is extended or adjusted under 35 U.S.C. 154(b) by 0 days.

(21) Appl. No.: 12/676,773

(22) PCT Filed: Sep. 2, 2008

(86) PCT No.: PCT/US2008/075001
§ 371 (c)(1),
(2), (4) Date: Mar. 5, 2010

(87) PCT Pub. No.: WO2009/032809
PCT Pub. Date: Mar. 12, 2009

(65) Prior Publication Data
US 2010/0247882 A1    Sep. 30, 2010

(30) Foreign Application Priority Data
Sep. 7, 2007 (GB) .................................. 0717507.8

(51) Int. Cl.
*D04H 1/00* (2006.01)
(52) U.S. Cl. .................. 428/292.1; 428/297.4
(58) Field of Classification Search ........... 428/292.1, 428/297.4
See application file for complete search history.

(56) References Cited

U.S. PATENT DOCUMENTS

| | | | |
|---|---|---|---|
| 3,018,290 A | 1/1962 | Sauers et al. | |
| 3,018,292 A | 1/1962 | Sauers et al. | |
| 3,627,780 A | 12/1971 | Bonnard et al. | |
| 3,770,691 A | 11/1973 | McLoughlin | |
| 3,839,358 A | 10/1974 | Bargain | |
| 4,377,657 A | 3/1983 | Street et al. | |
| 4,413,107 A | 11/1983 | Locatelli | |
| 4,874,661 A * | 10/1989 | Browne et al. | 442/248 |
| 5,057,353 A * | 10/1991 | Maranci et al. | 428/147 |
| 5,288,547 A * | 2/1994 | Elmes et al. | 428/308.4 |
| 5,389,435 A * | 2/1995 | Yap | 428/324 |
| 5,985,431 A * | 11/1999 | Oosedo et al. | 428/297.4 |
| 7,537,825 B1 * | 5/2009 | Wardle et al. | 428/292.1 |
| 7,740,925 B2 * | 6/2010 | Linker | 428/36.2 |

FOREIGN PATENT DOCUMENTS
EP    0383174 B1    5/1993
(Continued)

OTHER PUBLICATIONS

Iketani K. et al., "Laminated Sheet for Printed Circuit Board—Comprises Woven Glass"; Abstract from Database WPI Week 199832; Thomson Scientific, London, GB; AN 1998-370508; XP002502832.

(Continued)

*Primary Examiner* — N. Edwards
(74) *Attorney, Agent, or Firm* — Robert R. Neller; Thi D. Dang

(57) ABSTRACT

A composite material comprising the following components: (a) a first prepreg material with improved resistance to microbuckling and kinkband formation; and (b) a second prepreg material with improved resistance to delamination.

12 Claims, 6 Drawing Sheets

FOREIGN PATENT DOCUMENTS

| | | |
|---|---|---|
| EP | 0274899 B1 | 2/1994 |
| EP | 0311349 B1 | 9/1996 |
| EP | 0365168 B1 | 5/1999 |
| EP | 0707032 B1 | 11/2004 |
| WO | 02/16481 A1 | 2/2002 |

OTHER PUBLICATIONS

Iketani K. et al., Japanese Patent No. 10146916 (A); Jun. 2, 1998; applicant: Sumitomo Bakelite Co.; Abstract.

* cited by examiner

COMPOSITE MATERIALS AND THEIR USE

This application is the U.S. National Phase application of International Application No. PCT/US2008/075001, filed Sep. 2, 2008 and published as WO 2009/032809, which claims benefit of priority from Great Britain Patent Application No. 0717507.8, filed Sep. 7, 2007, each of which is incorporated by reference herein in its entirety.

FIELD OF THE INVENTION

The present invention relates to the design of composite material laminates and their use in complex and diverse high performance composite applications. In preferred embodiments, the present invention relates to a composite material that is tailorable to achieve maximized notched properties (high OHC and FHC), damage tolerance (CAI) and damage resistance (low delamination area and fiber breakage).

BACKGROUND OF THE INVENTION

Fiber-reinforced resin matrix composites are widely accepted for use as high strength low weight engineering materials to replace metals in aircraft structural applications and the like. These composite materials may be made by laminating material prepregs comprising high strength reinforcing fibers, such as glass, graphite (carbon), boron, aramid or the like impregnated with a thermoset or thermoplastic resin matrix. Important properties of such material composites are high strength and stiffness and reduced weight.

Prepreg material compositions comprising a blend of polymer resins, and reinforcing fibers are characterized by individual physical and chemical properties of the constituent polymer resins and reinforcing fibers, whereby compositions may be selected for a specific use. Typically, a thermoset resin matrix component is present which confers high solvent resistance, thermal cycling resistance, etc. In addition, a thermoplastic resin component may be added to the thermoset resin to confer higher levels of toughness etc, and reinforcing fibers are present which confer high levels of stiffness and strength.

Composites are traditionally made using material prepregs made up of reinforcing fiber or structural fabrics impregnated with a curable resin matrix composition. Sheets of prepreg materials may be cut to size for laying up, molding, curing and laminating in the construction of a given composite material. Prepreg properties and resulting composite material quality can be controlled to manipulate resulting composite material properties such as toughness, strength and flexibility.

Additives may be added to a base thermoset resin matrix formulation to increase toughness. Suitable additives include thermoplastics, flow modifiers, fillers etc.

Additives may also be added to thermoplastic resins for prepreg impregnation. These additives include plasticizers, fillers, flow modifiers etc.

Different design allowables are used when designing with composite materials depending on the status of stress, the geometry and the boundary conditions that characterize the composite material considered. One such design allowable is notched properties. Notched properties are very important when the designed structure contains holes and when fasteners are used. Notched properties measure of the ability of a given composite material to carry load once a hole is drilled on the load bearing region of the composite material itself. Such notched properties are referred to as Filled Hole Tension and Filled Hole Compression (FHT, FHC), and Open Hole Tension and Open Hole Compression (OHT, OHC). These notched properties are typically the critical design allowables for parts whose thickness is greater than 3 mm.

Tensile properties are in general governed by the properties of the reinforcing fibres while compressive properties are in general governed by the properties of the resin matrix as well as the fiber/matrix interface between the reinforcing and the resin.

Microbuckling can occur when a composite material laminate is loaded in compression. Microbuckling is a phenomenon that occurs when the reinforcing fibres in the composite material buckle under the compressive load.

Microbuckling can start in a specific location for several reasons including local misalignment of the reinforcing fibres, lack of support of the reinforcing fibres, stress concentration etc. Once microbuckling is initiated, it can spread throughout the composite material leading to the formation of a band of damaged composite material also known as kink band. An example of microbuckling is shown in FIG. 1 of the accompanying drawings.

Another design allowable that is extensively used when designing with composite materials is Compression Strength After Impact (CAI or CSAI). CAI measures the ability of a composite material to tolerate damage. In the test to measure CAI, the composite material is subject to an impact of a given energy and then loaded in compression. Damage area and dent depth are measured following the impact and prior to the compression test. During this test, the composite material is constrained during the test to ensure that no elastic instability is taking place and the strength of the composite material is recorded.

There are several approaches known in the art that may be used. One approach to improve CAI by improving toughness, although development continues to find means of improving toughness, through particle toughening, thermoplastic, rubber, core-shell rubber, etc. particle toughening, interlaminar toughening using veils or films of thermoplastics, or other known toughening materials.

One such approach involves the use of insoluble or partially soluble particles to improve the CAI of composite materials. However, the prior art does not demonstrate the use of insoluble or partially soluble particles with specific properties to improve OHC. Specifically, using insoluble or partially soluble particles to improve CAI uses a thermoplastic polymer that is soluble in the resin, which phase separates upon curing.

Another known approach to improve the CAI of a composite material is to use particles to modify the interlaminar region between the different prepreg material plies. The particles improve the interlaminar toughness of the composite material leading to a reduction in the delamination area induced by the impact. The reduction in the delamination area translates in higher residual compressive strength.

Another important property of a composite material is the damage resistance. A composite material with high damage resistance will incur less damage from a given impact event. Instead, composite materials with high damage tolerance may incur different levels of physical damage but will retain high amounts of residual strength.

Limited research has been carried out on approaches to improve the notched compressive properties of composites materials. U.S. Pat. No. 5,985,431 is directed to the use of specific epoxy resin ingredients in a specific range in order to improve the Open Hole Compression performance. However, no examples on how to tailor a composite material in order to improve the notched properties are available in patent literature or publications.

The present invention surprisingly overcomes the problems of prior composite materials by using different prepreg materials within the same composite material to improve notched compressive properties, damage tolerance and damage resistance of the resulting composite material.

DEFINITION OF THE INVENTION

A first aspect of the present invention provides a composite material comprising:
(a) a first prepreg material with improved resistance to microbuckling and kinkband formation; and
(b) a second prepreg material with improved resistance to delamination.

A second aspect of the present invention provides a composite material comprising:
(a) a first prepreg material having incorporated therein, insoluble and/or partially soluble particles; and
(b) a second prepreg material, characterized by at least one of:
   (i) incorporation of a thermoplastics component in the second prepreg material;
   (ii) incorporation of insoluble or partially soluble particles within the second prepreg material;
   (iii) incorporation of insoluble or partially soluble particles between layers of the second prepreg material; and
   (iv) incorporation of one or more strengthening interleafs between layers of the second prepreg material.

A third aspect of the present invention provides a process of making a composite material according to the first or second aspect of the present invention, the process comprising co-curing the first and second prepreg materials.

A fourth aspect of the present invention provides an article of manufacture comprising a composite material according to the first or second aspect of the present invention.

An additional aspect of the present invention provides a process for tailoring prepreg materials for an automated or non automated deposition process (Automated Fiber Placement, Automated Tape Laying, Continuous tape laying manufacturing, Hand lay up, Filament winding, Preforming, braiding, weaving) by adding specific components while the same material is being deposed on the tool or on other plies.

Preferred non-limiting features of the present invention are defined by the appended claims and the following description.

DETAILED DESCRIPTION OF THE INVENTION

The first and second prepreg materials can be co-cured in the same composite material. By tailoring the combination of these prepreg materials in the lay up, it is possible to improve significantly the notched compressive properties, damage tolerance and damage resistance of the resulting composite material.

Prepreg materials can be selected from thermoset prepreg, thermoplastic prepregs, resin infused textiles and preforms and combinations thereof.

The improved resistance to microbuckling and kinkband formation in respect of the first prepreg material may, for example be achieved by incorporation therein, of insoluble and/or partially soluble particles.

The improved resistance to delamination in respect of the second prepreg material may be achieved by at least one of:
   (i) incorporation of a thermoplastics component in the second prepreg material;
   (ii) incorporation of insoluble or partially soluble particles within the second prepreg material;
   (iii) incorporation of insoluble or partially soluble particles between layers of the second prepreg material; and
   (iv) incorporation of one or more strengthening interleafs between layers of the second prepreg material.

Figure 6:
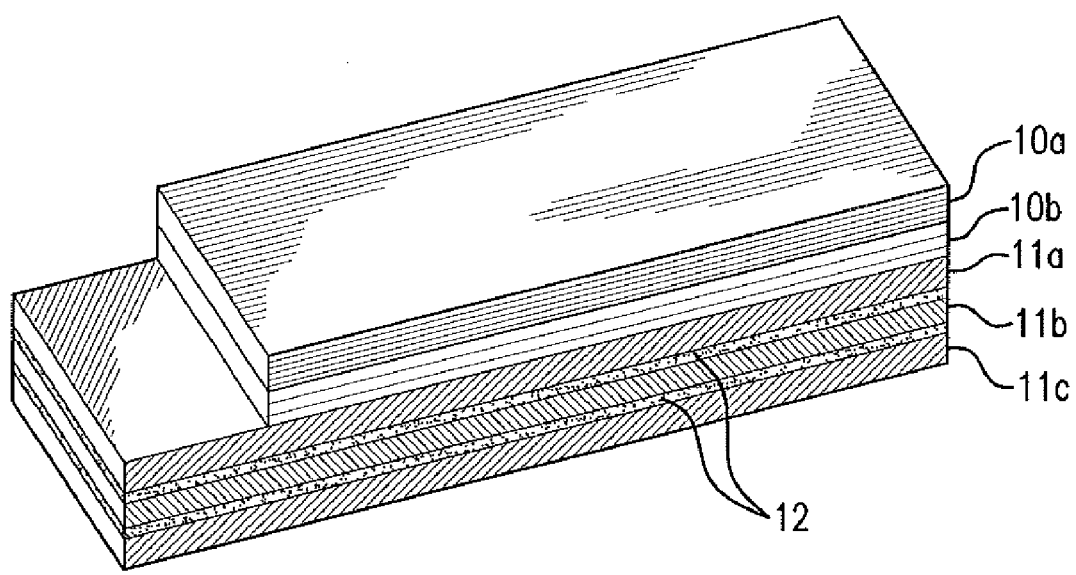
FIG. 6 schematically illustrates a prepreg layup arrangement according to an embodiment.

The arrangement of prepreg material plies in the composite material is preferably chosen so that:
   prepreg material plies with improved microbuckling and kinkband propagation resistance are used in 0° plies; and
   prepreg material plies with improved delamination resistance are used in the other plies, most preferably in the plies adjacent to the 0° plies FIG. 6 illustrates such prepreg layup arrangement. Referring to FIG. 6, prepreg material plies 10a, 10b (0° plies) with improved microbuckling and kinkband propagation resistance are placed adjacent to prepreg material plies 11a-11c (non-0° plies) with improved delamination resistance, wherein strengthening interleafs or interlaminar particles are incorpated between plies 11a-11c at location 12. Using this arrangement, higher notched compressive properties, damage tolerance and damage resistance performance can be achieved as compared to a composite material made by using only one of the components.

The invention applies to different prepreg material layups including different percentages of prepreg material plies at different angles. Typically used angles include but are not limited to 0°, 30°, 45°, 60° and 90°.

For a loaded structure the 0° direction would typically be the direction of the highest load the part has to withstand. For OHC, the 0° direction would be the direction of compression. For a prepreg material, the 0° is the longitudinal fiber direction in the roll of prepreg material.

The invention relies on a process for manufacturing composite materials with layers made of different prepreg materials according to the disclosure.

Figure 1:
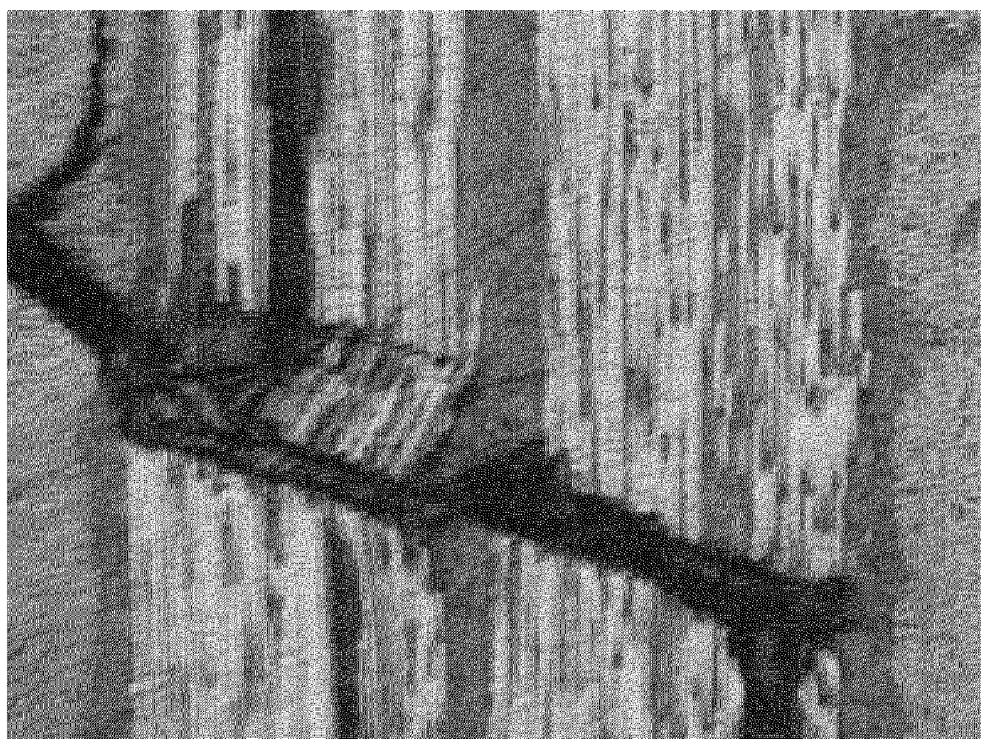
FIG. 1 shows a micrograph depicting buckling.
Figure 2:
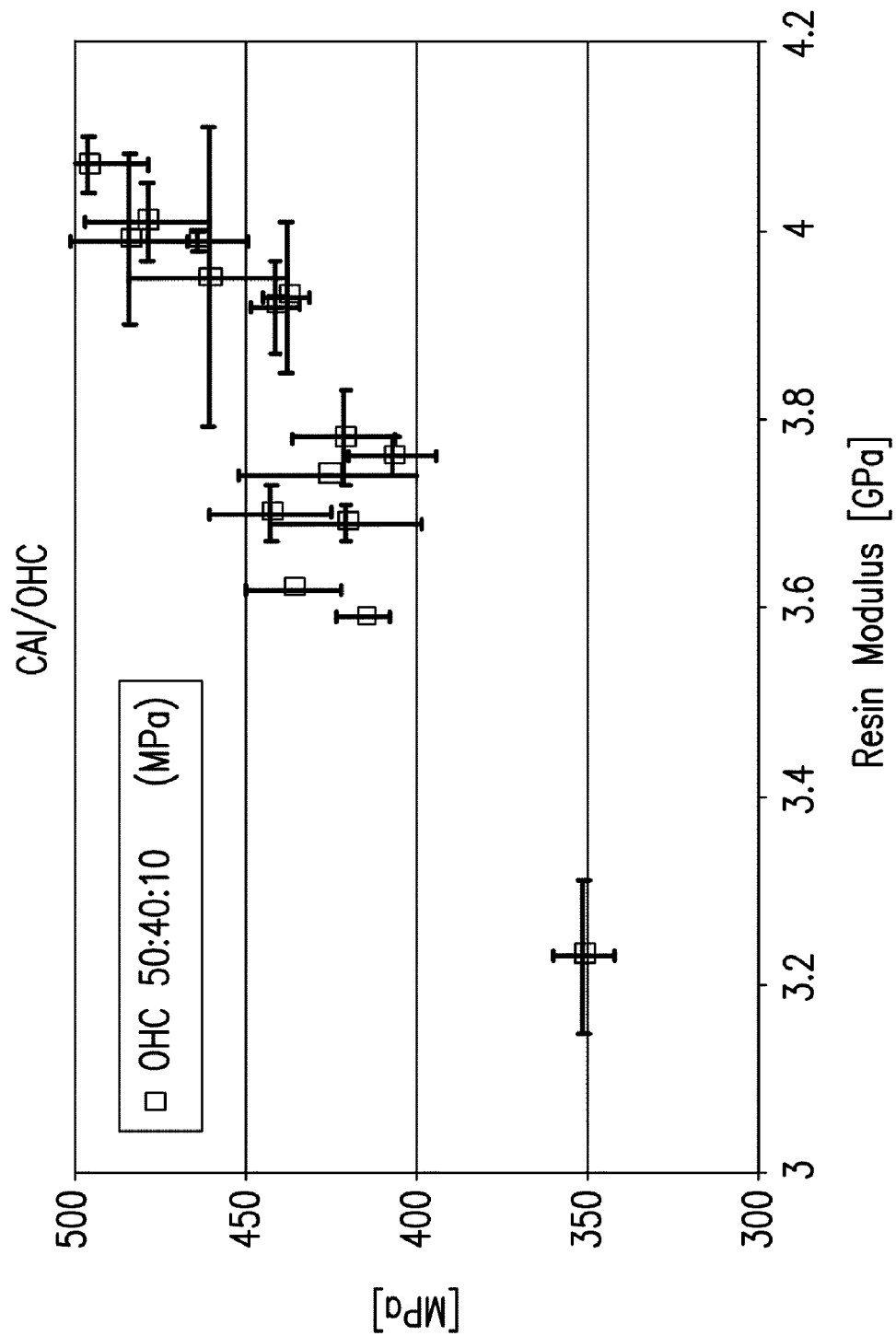
FIG. 2 shows a graphical depiction of the effect on OHC on increasing resin matrix modules.

The present invention demonstrates that a composite material with improved resistance to microbuckling and kinkband formation shows improved OHC. The present invention has found that incorporating methods of improving resistance to microbuckling and kinkband formation, improving OHC, comes from prepreg material plies with improved microbuckling and kinkband propagation resistance that are used in 0° plies. Means of improving resistance to microbuckling and kinkband formation are obtained by providing particles in the resin matrix as demonstrated in Examples 2 and 3 as described herein below, by appearing to maintain alignment of reinforcing fibers within the composite material during stress and contain delamination. Other means are improved resin matrix systems, preferably with improved modulus. An example of the increase in OHC by increasing resin matrix modulus is shown in FIG. 2 of the accompanying drawings.

Yet, further means for improving resistance to microbuckling and kinkband formation are higher strength and/or modulus reinforcing fibers.

Other methods to improve resistance to microbuckling and kinkband formation include modifying the interface between the resin matrix and the reinforcing fibers by influencing the reinforcing fiber surface treatment and/or sizing.

Figure 3:
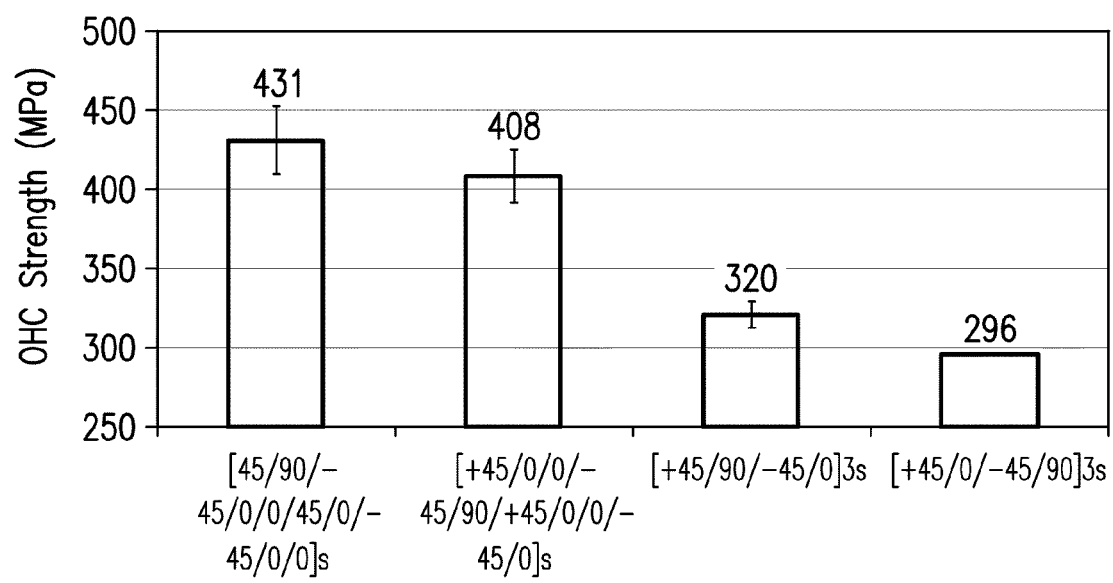
FIG. 3 shows some OHC strength data.

Prepreg material layup is also shown to affect OHC, as shown in FIG. 3 of the accompanying drawings.

Cured prepreg material ply thickness and AW can also affect OHC.

The present invention is founded on the discovery that the OHC failure is related to delamination of the composite. As delamination can be assessed through CAI testing, the present invention demonstrates that using materials with increased CAI in selected plies will improve OHC.

A composite material with improved resistance to delamination is one with improved CAI, G1C and G2C. Various methods can be incorporated to improve CAI by improving the prepreg material. One such method is through improved toughness, which is attained by adding thermoplastics to the resin matrix, particles to the resin matrix or between prepreg material layers, or thermoplastics between prepreg material layers by means of interleaf toughening with films, veils, etc.

Yet further methods of improving CAI include modifying the interface between the resin matrix and the reinforcing fibers by influencing the reinforcing fiber surface treatment and/or sizing.

It has further been found that prepreg material plies with improved delamination resistance are used in non-0° plies, most preferably in the prepreg material plies adjacent to the 0° prepreg material plies. Mention of 0° plies means plies arranged in a first (arbitrary) reference direction, whereby angles specified for plies in other directions are angles with respect to the reference direction.

Figure 4:
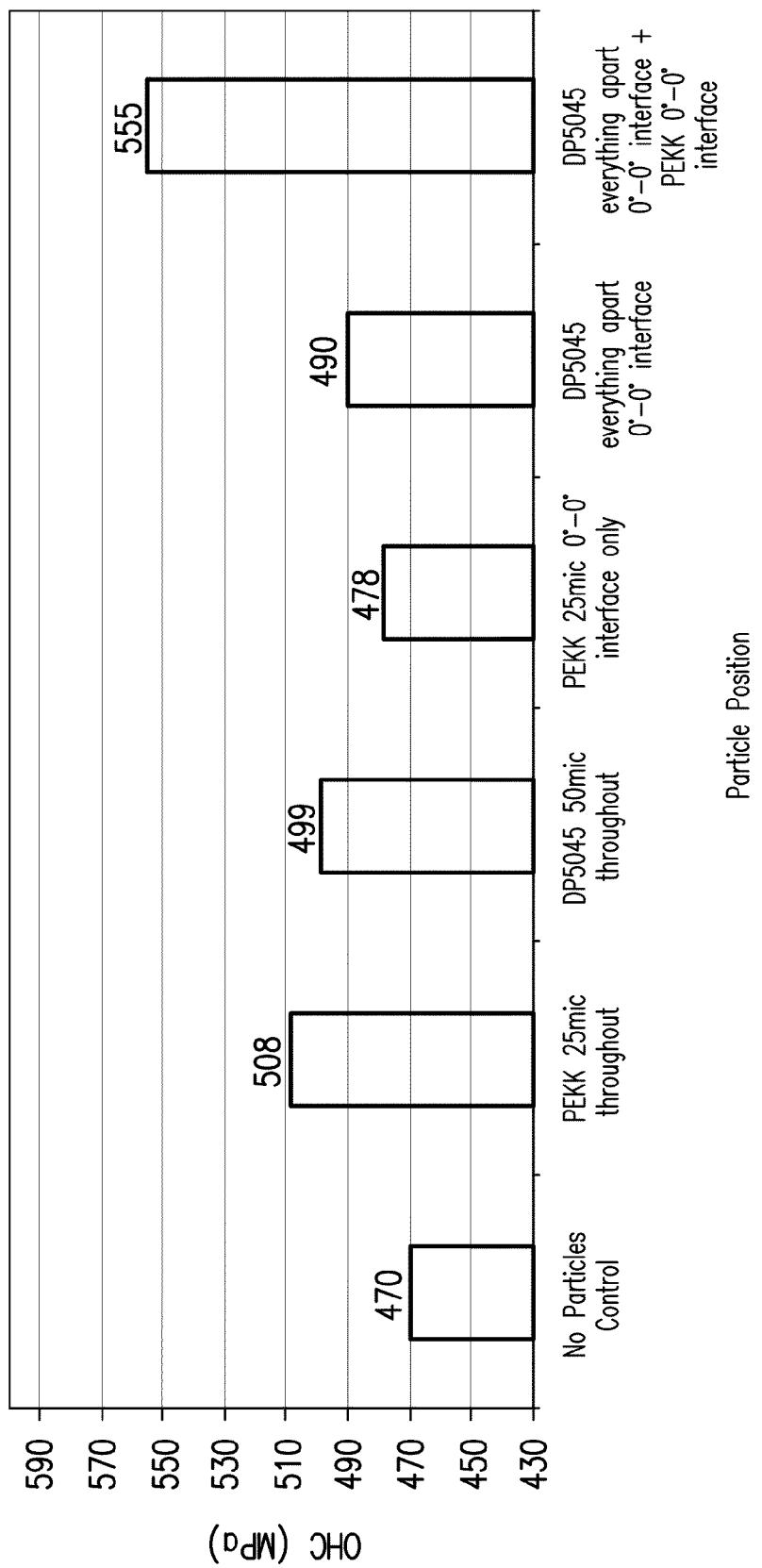
FIG. 4 shows OHC as a function of positioning of the particles.

Underlying the present invention is the finding that OHC failure stems from initial reinforcing fiber microbuckling and kink band propagation followed by delamination. In other words, kink bands propagate through the 0° layer while delaminations nucleate and grow as the reinforcing fibers undergo rotation. As such, the best method for improving OHC is through a tailored approach to composite formation by using prepreg materials with improved microbuckling and kinkband propagation resistance in 0° plies and prepreg materials with improved CAI, to improve resistance to delamination, used in non-0° plies, most preferably in the prepreg material plies adjacent to the 0° prepreg material plies. This can be seen from FIG. 4 of the accompanying drawings. Additional optimization of OHC can be found by identifying the optimal prepreg material layup by using different percentages of prepreg material plies at different angles.

Improvements in OHC test results are based upon a comparison to composite material that are not tailored, i.e. composite materials that incorporate no or just one method of improvement throughout. Examples 1, 2, and 3 of the accompanying drawings show the baseline composite material properties as compared to the tailored approach of the present invention.

The prepreg materials to be combined into the composite material can be designed and produced using different approaches:

Tailored interleafs can be created using one or more of the following various approaches:

A thermosetting resin film may be used to create a resin rich area in the region between two different prepreg materials, the thermosetting resin optionally being the same as in the resin matrix impregnating the reinforcing fibers or a different one;

A nonwoven textile, veil or fleece made of organic or inorganic fibres and combinations thereof may be used;

A film or membrane made of organic or inorganic material and combinations thereof may be used, the membrane optionally having different levels of permeability; and Heterogeneous fibers may be used, different than the ones used as a reinforcing fiber reinforcement, made of organic or inorganic material and combinations thereof, which may also be used as a tailored interleaf.

Insoluble or partially soluble particles may be incorporated between prepreg material plies and/or distributed in between the reinforcing fibers of any given prepreg material ply. Such particles may comprise or consist of organic and/or inorganic materials or hybrids, combinations and mixtures thereof. It is known to incorporate thermoplastic resin particles in prepegs from e.g. EP-A-0 707 032, EP-A-0 383 174, EP-A-0 274 899 or U.S. Pat. No. 4,874,661.

Thus, either or both of the prepreg materials may also contain one or more types of particles. If organic particles are considered, various polymers and combinations thereof can be used. The particles can be made of one or more resins selected from a group consisting of polyvinyl acetate, polyamides, polycarbonates, polyacetal, polyphenylene oxide, polyphenylene sulfide, polyallylates, polyesters, polyamidimides, polyimides, polyether imides, polysulfones, polyether sulfones, polyether ether ketones, polyether ketone ketones, polyaramid, polybenzoimidazole, polyethylene polypropylene, polyamides, cellulose acetate and cellulose butyrate and co-polymers thereof.

Crosslinking agents can be used in the particle formulation to achieve a crosslinked network.

The particles can also be a blend of thermoplastic and thermoset resins, elastomers and crosslinked elastomers (i.e.: DuoMod DP5045 sold by Zeon Chemicals Inc).

Inorganic particles might include glass, silica, carbon, metal.

The particle size distribution of the particular invention preferably spans any range within the limits from 1 μm to 150 μm.

The present invention also surprisingly demonstrates that the use of insoluble or partially soluble polymer particles increases the OHC of a resin system by up to 21%. Various factors affect the increase and tailoring the particle type to the resin type is preferred.

Tests performed using different particles having an average size varying from 40 μm to 60 μm and different resin systems are shown in Table I below.

TABLE I

| Particle | Description | 997 OHC (50:40:10) % improvement over baseline | 5276-1 OHC (50:40:10) % improvement over baseline | Non-commercial system |
|---|---|---|---|---|
| PEKK | Semi crystalline TP polymer | +11.2% | +10.3% | 21.3% |
| DP5045 | Pre-formed rubber | — | — | 6.4% |
| PPO-HPP820 | Semi crystalline TP polymer | +5% | +8.6% | |
| TN | Toray particle | −1.6% | 0% | |
| TR55 | Amorphous TP polymer | −4.6% | −3.4% | |
| P84 | Amorphous TP polymer | −3.2% | 0% | |
| P84HT | Amorphous TP polymer | −1.4% | | −3.4% |

This table illustrates that the increase in OHC depends on the resin and the particles type. Particles comprised of PEKK, PPO and DP5045 show an improvement in OHC performance, while TN, TR55, P84 and P84NT appear to be neutral.

Tailored fibres in the prepreg for each ply of the lay-up can also be used in prepreg materials. The candidate fibres that can be used can have a diameter that can range from 1 um to 150 um, a modulus from 1 GPa to 700 GPa, a tensile strength from 200 MPa to 10,000 MPa. The fibre can be organic, especially of stiff polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are those supplied by Cytec Carbon Fibers under the trade designations T40/800, T650-35 and T300; those supplied by Toray under the trade designation T300, T700, T800G, T800S, T800-HB, T1000G, M46J, M50J, M55J, M60J; those supplied by Hexcel under the trade designations AS4, AS7, IM7, IM8 and IM9; and those supplied by Toho Tenax under the trade designations HTA, HTS, UTS, IMS. Organic or carbon fibre is preferably unsized or is sized with a material that is compatible with the composition according to the invention, in the sense of being soluble in the resin without adverse reaction or of bonding both to the fibre and to the thermoset/thermoplastic composition according to the invention. In particular carbon or graphite fibres that are unsized or are sized with epoxy resin precursor. Inorganic fibre preferably is sized with a material that bonds both to the fibre and to the polymer composition; examples are the organo-silane coupling agents applied to glass fibre.

Reinforcing fibres properties can be further tailored for the application using different surface treatments.

The first composite material preferably respectively comprise reinforcing fibers and a resin matrix composed of one or more materials well known in the art, for example as disclosed in any of EP-A-0 311 349, EP-A-0 707 032, and WO-A-02/16481.

The first prepreg material preferably comprises reinforcing fibers and a resin matrix selected from high modulus epoxy resins with interlaminar particles. Preferred resins have an elastic modulus higher than 3.4 GPA. Examples of preferred resins are Cycom 977-3 and Cycom 997 manufactured by Cytec Industries Inc. Preferred interlaminar particles include PEKK, PPO with a particles size distribution between 10 and 40 micron.

The second prepreg material preferably comprises reinforcing fibers and a resin matrix selected from high toughness epoxy resins with interlaminar particles. Preferred resins have a fracture toughness G, higher than 0.200 kJ/m$^2$ where $G_c$ is the critical strain energy release rate in creating new crack area. Examples of suitable resin systems include Cycom 977-2 manufactured by Cytec Industries Inc.

Preferred interlaminar particles include DP5045, P84, Nylon, PPO and PPS with a preferred particle size between 10 and 40 micron. Examples of systems containing interlaminar particles that are preferred for this invention include Cycom 5276-1 manufactured by Cytec Industries Inc.

A tailored resin matrix in the prepreg material for each ply of the lay-up can also be used. Different characteristics of the resin matrix can be changed by altering the resin matrix chemistry. The following properties can be modified to suit the present invention: Yield strength, Modulus, Fiber wetting capability, Phase separation, Toughness, Tg, Crosslink density.

As a generality, any resin matrix used in the present invention can comprise or consist essentially of a thermoplastic or a thermosetting resin. Preferably the prepreg material layup is designed such that the resin matrix in the 0° prepreg material plies has a higher elastic modulus than the resin matrix in the other prepreg material plies. Preferably a thermosetting resin is used that may be selected from the group consisting of an epoxy resin, an addition-polymerization resin, especially a bis-maleimide resin, a formaldehyde condensate resin, especially a formaldehyde-phenol resin, a cyanate resin, an isocyanate resin, a phenolic resin and mixtures of two or more thereof, and is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof, a cyanate ester resin, benzimidazole, polystyryl pyridine, polyimide or a phenolic resin. Examples of addition-polymerization resin are acrylics, vinyls, bis-maleimides, and unsaturated polyesters. Examples of formaldehyde condensate resins are urea, melamine and phenols. More preferably the thermosetting matrix resin comprises at least one epoxy, cyanate ester or phenolic resin precursor, which is liquid at ambient temperature for example as disclosed in EP-A-0311349, EP-A-0365168, EP-A-91310167.1 or in PCT/GB95/01303. Preferably the thermoset is an epoxy resin.

An epoxy resin may be selected from N,N,N'N'-tetraglycidyl diamino diphenylmethane (e.g. "MY 9663", "MY 720" or "MY 721" sold by Huntsman) viscosity 10-20 Pa s at 50° C.; (MY 721 is a lower viscosity version of MY 720 and is designed for higher use temperatures); N,N,N',N-tetraglycidyl-bis(4-aminophenyl)-1,4-diiso-propylbenzene (e.g. Epon 1071 sold by Hexion) viscosity 18-22 Poise at 110° C.; N,N,N',N'-tetraglycidyl-bis(4-amino-3,5-dimethylphenyl)-1,4-diisopropylbenzene, (e.g. Epon 1072 sold by Hexion) viscosity 30-40 Poise at 110° C.; triglycidyl ethers of p-aminophenol (e.g. "MY 0510" sold by Huntsman), viscosity 0.55-0.85 Pa s at 25° C.; preferably of viscosity 8-20 Pa at 25° C.; preferably this constitutes at least 25% of the epoxy components used; diglycidyl ethers of bisphenol A based materials such as 2,2-bis(4,4'-dihydroxy phenyl) propane (e.g. "DER 661" sold by Dow, or "Epikote 828" sold by Hexion), and Novolak resins preferably of viscosity 8-20 Pa s at 25° C.; glycidyl ethers of phenol Novolak resins (e.g. "DEN 431" or "DEN 438" sold by Dow), varieties in the low viscosity class of which are preferred in making compositions according to the invention; diglycidyl 1,2-phthalate, e.g. GLY CEL A-100; diglycidyl derivative of dihydroxy diphenyl methane (Bisphenol F) (e.g. "PY 306" sold by Huntsman) which is in the low viscosity class. Other epoxy resin precursors include cycloaliphatics such as 3',4'-epoxycyclohexyl-3,-4-epoxycyclohexane carboxylate (e.g. "CY 179" sold by Ciba Geigy) and those in the "Bakelite" range of Hexion.

A cyanate ester resin may be selected from one or more compounds of the general formula NCOAr(YxArm)qOCN and oligomers and/or polycyanate esters and combinations thereof wherein Ar is a single or fused aromatic or substituted aromatics and combinations thereof and therebetween nucleus linked in the ortho, meta and/or para position and x=0 up to 2 and m and q=0 to 5 independently. The Y is a linking unit selected from the group consisting of oxygen, carbonyl, sulphur, sulphur oxides, chemical bond, aromatic linked in ortho, meta and/or para positions and/or CR2 wherein R1 and R2 are hydrogen, halogenated alkanes, such as the fluorinated alkanes and/or substituted aromatics and/or hydrocarbon units wherein said hydrocarbon units are singularly or multiply linked and consist of up to 20 carbon atoms for each R1 and/or R2 and P(R3R4R'4R5) wherein R3 is alkyl, aryl alkoxy or hydroxy, R'4 may be equal to R4 and a singly linked oxygen or chemical bond and R5 is doubly linked oxygen or chemical bond or Si(R3R4R'4R6) wherein R3 and R4, R'4 are defined as in P(R3R4R'4R5) above and R5 is defined similar to R3 above. Optionally, the thermoset can consist essentially of cyanate esters of phenol/formaldehyde derived Novolaks or dicyclopentadiene derivatives thereof, an example of which is XU71787 sold by the Dow Chemical Company. A phenolic resin may be selected from any aldehyde condensate resins derived from aldehydes such as methanal, ethanal, benzaldehyde or furfuraldehyde and phenols such as phenol, cresols, dihydric phenols, chlorophenols and C1-9 alkyl phenols, such as pheol, 3- and 4-cresol (1-methyl, 3- and 4-hydroxy benzene), catechol (2-hydroxy phenol), resorcinol (1,3-dihydroxy benzene) and quinol (1,4-dihydroxy benzene). Preferably phenolic resins comprise cresol and novolak phenols. Suitable bismaleimide resins are heat-curable resins containing the maleimido group as the reactive functionality.

The term bismaleimide as used herein includes mono-, bis-, tris-, tetrakis-, and higher functional maleimides and their mixtures as well, unless otherwise noted. Bismaleimide resins with an average functionality of about two are preferred. Bismaleimide resins as thusly defined are prepared by the reaction of maleic anhydride or a substituted maleic anhydride such as methylmaleic anhydride, with an aromatic or aliphatic di- or polyamine.

Examples of the synthesis may be found, for example in U.S. Pat. Nos. 3,018,290, 3,018,292, 3,627,780, 3,770,691 and 3,839,358. The closely related nadicimide resins, prepared analogously from a di- or polyamine but wherein the maleic anhydride is substituted by a Diels-Alder reaction product of maleic anhydride or a substituted maleic anhydride with a diene such as cyclopentadiene, are also useful. As used herein and in the claims, the term bismaleimide shall include the nadicimide resins. Preferred di- or polyamine precursors include aliphatic and aromatic diamines. The aliphatic diamines may be straight chain, branched, or cyclic, and may contain heteroatoms. Many examples of such aliphatic diamines may be found in the above cited references.

Especially preferred aliphatic diamines are hexanediamine, octanediamine, decanediamine, dodecanediamine, and trimethylhexanediamine. The aromatic diamines may be mononuclear or polynuclear, and may contain fused ring systems as well. Preferred aromatic diamines are the phenylenediamines; the toluenediamines; the various methylenedianilines, particularly 4,4'-methylenedianiline; the napthalenediamines; the various amino-terminated polyarylene oligomers corresponding to or analogues to the formula H2N—Ar[X—Ar]nNH2, wherein each Ar may individually be a mono- or poly-nuclear arylene radical, each X may individually be -0-, —S—, —C02, —S02-, -0-C0-, C1-C10 lower alkyl, C1-C10 halogenated alkyl, C2-C10 lower alkyleneoxy, aryleneoxy, polyoxyalkylene or polyoxyarylene, and wherein n is an integer of from about 1 to 10; and primary aminoalkyl terminated di- and polysiloxanes. Particularly useful are bismaleimide "eutectic" resin mixtures containing several bismaleimides. Such mixtures generally have melting points which are considerably lower than the individual bismaleimides. Examples of such mixtures may be found in U.S. Pat. Nos. 4,413,107 and 4,377,657. Several such eutectic mixtures are commercially available.

A resin matrix can also be a thermoplastic resin. The thermoplastic can be a crystalline, semi-crystalline or amorphous polymer. Examples of suitable thermoplastics include polyamides, polycarbonates, polyphenylene oxide, polyphenylene sulfide, polyallylates, polyesters, polyamidimides, polyimides, polyether imides, polysulfones, polyether sulfones, polyether ether ketones, polyaramid, polybenzoimidazole, polyethylene polypropylene, polyamides, cellulose acetate and cellulose butyrate and co-polymers thereof.

A cured ply thickness or reinforcing fibres areal weight in the composite material can be used to tailor the composite material properties. Examples of suitable cured ply thickness range from 50 micron to 1000 micron. Example of suitable fibres areal weight AW range from 50 gsm to 1000 gsm.

The present invention can be implemented by introducing interleafs, particles, resins and modifiers in general while a component is being manufactured using a manual or automated process.

In a preferred embodiment an automated head is used that can depose particles and interleafs on the surface of the prepreg material as it is being laid down. This allows tailoring of the prepreg material 'in situ'.

Examples of suitable processes include Automated Fiber Placement, Automated Tape Laying, Continuous tape laying manufacturing, Hand lay up and Filament winding.

The present invention will now be explained in more detail by way of the following examples.

EXAMPLES

Example 1

A resin mixture is prepared using the ingredients described in Table 1:

TABLE 1

| Ingredient ID | Ingredient | Trade name | Quantity |
| --- | --- | --- | --- |
| 1 | Tetraglycidyldiamino-diphenylmethane | Araldite MY721 | 15.36 |
| 2 | Triglycidyl-p-aminophenol | Araldite MY0510 | 35.84 |
| 3 | 3-3'-diaminodiphenylsulfone | 33'DDS | 23.81 |
| 4 | PES:PEES copolymer | Internal product | 25.00 |

Ingredients 1 and 2 are put in the vessel of a two shaft mixer. Ingredient 4 is added. The resin mixture is heated to 120° C. and stirred until ingredient 4 has dissolved completely. Temperature is lowered to 70° C., ingredient 3 is added to the resin mixture. Ingredient 3 is dispersed or dissolved in the resin mixture. Intermediate modulus reinforcing Carbon Fibres IMS 12k from Toho Tenax (Japan) are used to produce an unidirectional fabric with a reinforcing fibre aerial weight of 190 grams per square meter. The resin mixture is filmed to an aerial weight of 51 grams per square meter. Two films are combined with the reinforcing fibres to give a prepreg material.

Figure 5:
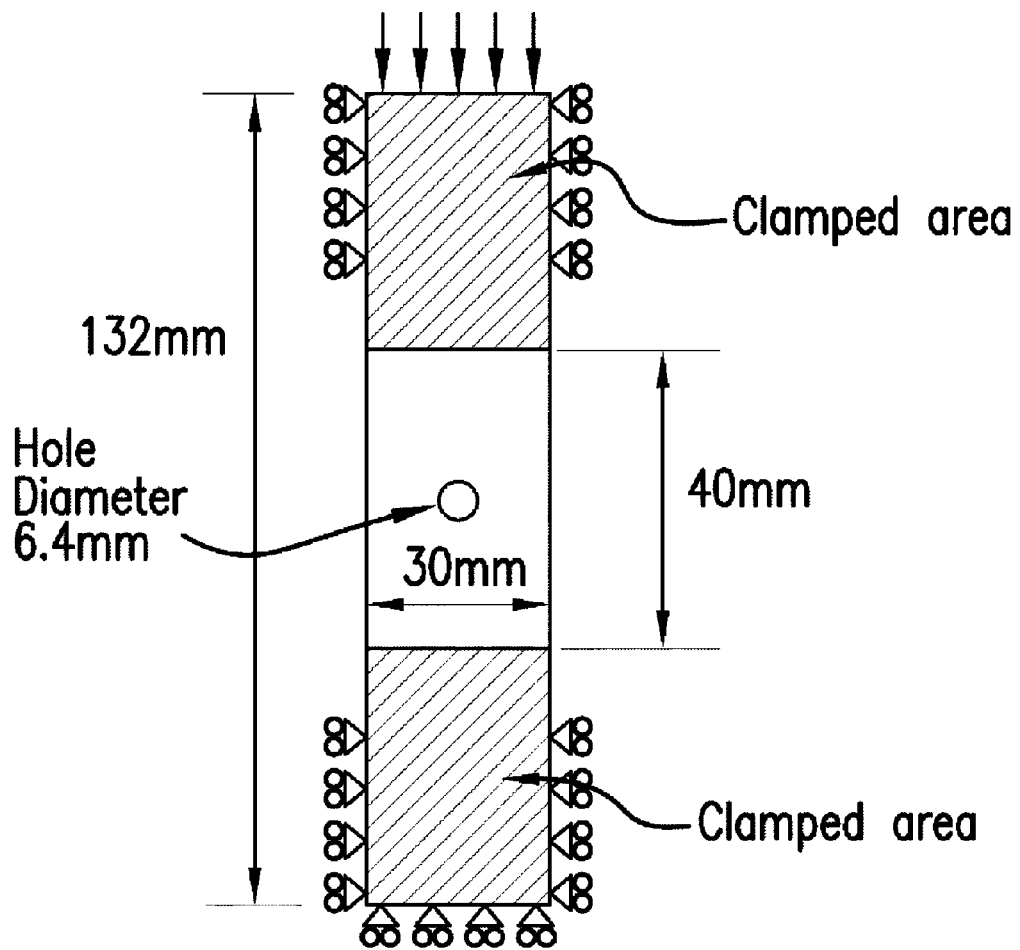
FIG. 5 shows the dimensioning of coupons used in an example.

The prepreg material was layered up in a panel using the following stacking sequence [+45/90/−45/0/0/+45/0/−45/0/0]s, and then cured in an autoclave. During cure the temperature was increased at a rate of 2° C./min up to 180° C. After a dwell of 2 h at 180° C. the panel was cooled down to room temperature at about 3° C./min. 6.5 Bar pressure was applied to the panel during the cure cycle. Coupons were cut from the panel according to the dimensions as shown in FIG. 5.

The coupons were tested using a Zwick test machine incorporating a 100 kN load cell. The coupons were clamped at each end to avoid elastic instability problems. A constant crosshead speed of 0.8 mm/min was used to load the coupons.

At the end of the test the OHC value was obtained according to the following expression:

OHCst=(Max Load)/(Gross Area)

Where:
OHCst=OHC Strength
Load=maximum load
Gross Area=Area obtained multiplying the coupon width by the coupon thickness
Results of the Test:
OHC=470 MPa Example 2

A resin mixture is prepared using the ingredients described in Table 2:

TABLE 2

| Ingredient ID | Ingredient | Trade name | Quantity |
|---|---|---|---|
| 1 | tetraglycidyldiamino-diphenylmethane | Araldite MY721 | 15.19 |
| 2 | Triglycidyl-p-aminophenol | Araldite MY0510 | 35.45 |
| 3 | 3-3'-diaminodiphenylsulfone | 33DDS | 23.55 |
| 4 | PES:PEES copolymer | Internal product | 20.81 |
| 5 | Preformed crosslinked polymer particles | DuoMod DP5045 | 5 |

The same preparation method as the one described in Example 1 was used. Ingredient 5 was dispersed in the resin mixture before discharging from the mixer vessel. The resin mixture was then filmed to 51 grams per square meter. Two films and the reinforcing fibres were then combined to obtain a prepreg material. During the prepregging phase the particles undergo partial or total filtration through the carbon fibres concentrating the particles on the surface of the prepreg material. Coupons were prepared, machined and tested according to the procedure described in Example 1.
Result of the Test:
OHC=499 MPa To measure the CAI, coupons are impacted at 25 J using a drop weight impact tester. The impactor nose had a diameter of 16±0.5 mm and a hemisphere radius of 8±0.25) mm. The CAI test was conducted using a Zwick test machine incorporating a 200 kN load cell. An antibuckling jig which allows end loading of the coupon was used to reduce the risk of invalid failure. A constant crosshead speed of 0.5 mm/min was used to load the coupons.
Results of the Test
CAI=259 MPa As evidenced by the results the system exhibited a high Compression Strength after Impact.

Example 3

A resin mixture is prepared using the ingredients describe in Table 3:

TABLE 3

| Ingredient ID | Ingredient | Trade name | Quantity |
|---|---|---|---|
| 1 | tetraglycidyldiamino-diphenilmethane | Araldite MY721 | 14.36 |
| 2 | Triglycidyl-p-aminophenol | Araldite MY0510 | 33.51 |
| 3 | 3-3'-diaminodiphenylsulfone | 33DDS | 22.26 |
| 4 | PES:PEES copolymer | Internal product | 23.38 |

TABLE 3-continued

| Ingredient ID | Ingredient | Trade name | Quantity |
|---|---|---|---|
| 5 | Poly Ether Ketone Ketone (25 um average diameter - jet milled particles) | Internal product | 6.5 |

The same preparation method as the one described in Example 2 was used with the PEKK particles instead than the DP5045. Coupons were prepared, machined and tested according to the procedure described in Example 1.
Results of the Test
OHC=508 MPa Example 4

Material from Example 2 and Example 3 were used according to the following designation (Table 4):

TABLE 4

| Material A | Example 2 |
|---|---|
| Material B | Example 3 |

Prepreg Materials were used to lay-up a panel using the following stacking sequence [+45/90/−45/0/0/+45/0/−45/0/0]s. The following prepreg material ply orientation was used for the lay-up (Table 5):

TABLE 5

| Layer orientation | Material |
|---|---|
| +45, −45, 90 | Material A |
| 0 | Material B |

Same procedure as the one used in Example 1 was used to cure, machine and test the coupons.
Results:
OHC=555 MPa Example 5

A resin mixture is prepared using the ingredients described in Table 6:

TABLE 6

| Ingredient ID | Ingredient | Trade name | Quantity |
|---|---|---|---|
| 1 | Tetraglycidyldiamino-diphenylmethane | Araldite MY721 | 25.53 |
| 2 | Triglycidyl-m-aminophenol | Araldite MY0600 | 25.53 |
| 3 | 3-3'-diaminodiphenylsulfone | 33'DDS | 28.94 |
| 4 | PES polymer | 5003P | 20 |

Ingredients 1 and 2 are put in the vessel of a two shaft mixer. Ingredient 4 is added. The resin mixture is heated to 120° C. and stirred until ingredient 4 has dissolved completely. Temperature is lowered to 70° C., ingredient 3 is added to the resin mixture. Ingredient 3 is dispersed or dissolved in the resin mixture. Intermediate modulus reinforcing Carbon Fibres IMS 12k from Toho Tenax (Japan) are used to produce an unidirectional fabric with a reinforcing fibre aerial weight of 190 grams per square meter. The resin mixture is filmed to an aerial weight of 51 grams per square meter. Two films are combined with the reinforcing fibres to give a prepreg material.

The prepreg material was laid up in a panel using the following stacking sequence [+45/90/−45/0/0/+45/0−45/0/0]s, and then cured in an autoclave. During cure the temperature was increased at a rate of 2° C./min up to 180° C. After a dwell of 2 h at 180° C. the panel was cooled down to room temperature at about 3° C./min. A pressure of 6.5 Bar was applied to the panel during the cure cycle. Coupons were cut from the panel according to the dimensions as shown in FIG. 5.

The coupons were tested using a Zwick test machine incorporating a 100 kN load cell. The coupons were clamped at each end to avoid elastic instability problems. A constant crosshead speed of 0.8 mm/min was used to load the coupons.

At the end of the test the OHC value was obtained according to the following expression:

OHCst=(Max Load)/(Gross Area)

Where:
OHCst=OHC Strength
Load=maximum load
Gross Area=Area obtained multiplying the coupon width by the coupon thickness
Results of the Test:
OHC=430 MPa

Example 6

A resin mixture is prepared using the ingredients described in Table 7:

TABLE 7

| Ingredient ID | Ingredient | Trade name | Quantity |
| --- | --- | --- | --- |
| 1 | tetraglycidyldiamino-diphenylmethane | Araldite MY721 | 24.25 |
| 2 | Triglycidyl-m-aminophenol | Araldite MY0600 | 24.25 |
| 3 | 3-3'-diaminodiphenylsulfone | 33DDS | 27.49 |
| 4 | PES polymer | 5003P | 19.00 |
| 5 | Preformed crosslinked polymer particles | DuoMod DP5045 | 5 |

The same preparation method as the one described in Example 5 was used. Ingredient 5 was dispersed in the resin mixture before discharging from the mixer vessel. The resin mixture was then filmed to 51 grams per square meter. Two films and the reinforcing fibres were then combined to obtain a prepreg material. During the prepregging phase the particles undergo partial or total filtration through the carbon fibres concentrating the particles on the surface of the prepreg material. Coupons were prepared, machined and tested according to the procedure described in Example 1.
Result of the Test:
OHC=432 MPa

Example 7

A resin mixture is prepared using the ingredients describe in Table 8:

TABLE 8

| Ingredient ID | Ingredient | Trade name | Quantity |
| --- | --- | --- | --- |
| 1 | tetraglycidyldiaminodiphenilmethane | Araldite MY721 | 23.87 |
| 2 | Triglycidyl-m-aminophenol | Araldite MY0600 | 23.87 |
| 3 | 3-3'-diaminodiphenylsulfone | 33DDS | 27.06 |
| 4 | PES Polymer | 5003P | 18.70 |
| 5 | Poly Ether Ketone Ketone (25 um average diameter - jet milled particles) | Internal product | 6.5 |

The same preparation method as the one described in Example 6 was used with the PEKK particles instead than the DP5045. Coupons were prepared, machined and tested according to the procedure described in Example 5.
Results of the Test
OHC=433 MPa

Example 8

Material from Example 6 and Example 7 were used according to the following designation (Table 9):

TABLE 9

| Material A' | Example 6 |
| --- | --- |
| Material B' | Example 7 |

Prepreg materials were used to lay-up a panel using the following stacking sequence [+45/90/−45/0/0/+45/0/−45/0/0]s. The following prepreg material ply orientation was used for the lay-up (Table 10):

TABLE 10

| Layer orientation | Material |
| --- | --- |
| +45, −45, 90 | Material A' |
| 0 | Material B' |

Same procedure as the one used in Example 5 was used to cure, machine and test the coupons.
Results:
OHC=438 MPa

Comparative Example 1

Results from Examples 1 and Example 2 are compared in Table 11. As evidenced by the table the use of DP5045 lead to an improvement of the OHC performance thanks to the ability of the particles used to inhibit delamination as extensively reported in literature (Eric N. Gilbert, Brian S. Hayes, James C. Seferis, Composites: Part A 34 (2003) 245-252). It is also thanks to this mechanism that high CAI performance can be achieved.

TABLE 11

| Example 1 | 470 MPa |
| --- | --- |
| Example 2 | 499 MPa |

Comparative Example 2

Results from Examples 1 and Example 3 are compared in Table 12. As shown by the table, the use of PEKK lead to an improvement of the OHC performance thanks to the ability of the particles to interfere with the kinkband and delamination propagation.

TABLE 12

| Example 1 | 470 MPa |
|---|---|
| Example 3 | 508 MPa |

Comparative Example 3

Results from Example 1, Example 2 and Example 3 and Example 4 are compared in Table 13. As evidenced by the results the best performance in terms of OHC were achieved when the prepreg material ply orientation as described in Example 4 was used. This is due to the fact that in the Example 4, the prepreg material choice and prepreg material ply orientation was tailored to maximize OHC.

TABLE 13

| Example 1 | 470 MPa |
|---|---|
| Example 2 | 499 MPa |
| Example 3 | 508 MPa |
| Example 4 | 555 MPa |

Comparative Example 4

Results from Examples 5 and Example 6 are compared in Table 14. As evidenced by the table the use of DP5045 lead to an improvement of the OHC performance thanks to the ability of the particles used to inhibit delamination It is also thanks to this mechanism that high CAI performance can be achieved.

TABLE 14

| Example 5 | 430 MPa |
|---|---|
| Example 6 | 432 MPa |

Comparative Example 5

Results from Examples 1 and Example 3 are compared in Table 15. As shown by the table, the use of PEKK lead to an improvement of the OHC performance thanks to the ability of the particles to interfere with the kinkband and delamination propagation.

TABLE 15

| Example 1 | 470 MPa |
|---|---|
| Example 3 | 508 MPa |

Comparative Example 6

Results from Example 5, Example 6 and Example 7 and Example 8 are compared in Table 16. As evidenced by the results the best performance in terms of OHC were achieved when the prepreg material ply orientation as described in Example 8 was used. This is due to the fact that in Example 8, the prepreg material choice and prepreg material ply orientation was tailored to maximize OHC.

TABLE 16

| Example 5 | 430 MPa |
|---|---|
| Example 6 | 432 MPa |

TABLE 16-continued

| Example 7 | 433 MPa |
|---|---|
| Example 8 | 438 MPa |

The invention claimed is:

1. A composite material comprising:
   (a) a first prepreg material with improved resistance to microbuckling and kinkband formation achieved by incorporation therein, of insoluble and/or partially soluble particles; and
   (b) a second prepreg material with improved resistance to delamination achieved by at least one of:
      (i) incorporation of a thermoplastics component in the second prepreg material;
      (ii) incorporation of insoluble or partially soluble particles within the second prepreg material;
      (iii) incorporation of insoluble or partially soluble particles between layers of the second prepreg material; and
      (iv) incorporation of one or more strengthening interleafs between layers of the second prepreg material,
   wherein the first prepreg material and the second prepreg material are respectively arranged in contacting relation in a first direction and a second direction.

2. A composite material according to claim 1, wherein the first prepreg material comprises reinforcing fibers impregnated with a first resin and the second prepreg material comprises a reinforcing fibers impregnated with a second resin different from the first resin.

3. A composite material according to claim 1, wherein the particles are selected from the group consisting of organic, inorganic, a blend of organic and inorganic or organic/inorganic hybrids insoluble or partially insoluble particles.

4. A composite material according to claim 1 where the insoluble or partially insoluble particles comprise essentially of one of the following polymers: polyvinyl acetate, polyamides, polycarbonates, polyacetal, polyphenylene oxide, polyphenylene sulfide, polyallylates, polyesters, polyamidimides, polyimides, polyether imides, polysulfones, polyether sulfones, polyether ether ketones, polyether ketone ketones, polyaramid, polybenzoimidazole, polyethylene polypropylene, polyamides, cellulose acetate and cellulose butyrate and co-polymers thereof.

5. A composite material according to claim 1, where the strengthening interleafs comprise at least two interleafs respectively having different compositions from each other.

6. A composite material according to claim 1, wherein the at least one strengthening interleaf is selected from the group consisting of:
   a) a thermosetting resin film for creating a resin rich area in the region between two different prepreg materials;
   b) a nonwoven textile, veil or fleece made of organic or inorganic fibers and combinations thereof;
   c) a film or membrane comprising organic or inorganic materials and combinations thereof; and
   d) heterogeneous fibers comprising organic or inorganic material and combinations thereof with different fibers than the ones used as a reinforcing fiber.

7. A composite material according to claim 1 wherein the first prepreg material is used in 0° plies and the second prepreg material is used in non-0° plies.

8. A composite material according to claim 2 where the first resin in the first prepreg material possesses an elastic modulus that is higher than elastic modulus of the second resin.

9. A composite material according to claim 2, wherein the first prepreg material and the second prepreg material comprise at least two different reinforcing fibers.

10. A composite material according to claim 6, wherein the first prepreg material comprises reinforcing fibers different from the reinforcing fibers of the second prepreg material.

11. A composite material according to claim 1, where the first prepreg material and the second prepreg material comprises reinforcing fibers selected from carbon fibres, aramid fibers, glass fibres, alumina, zirconia, silicon carbide, other compound ceramics or metals.

12. A cured composite comprising co-curing
   (a) a first prepreg material with improved resistance to microbuckling and kinkband formation achieved by incorporation therein, of insoluble and/or partially soluble particles; and
   (b) a second prepreg material with improved resistance to delamination achieved by at least one of:
      (i) incorporation of a thermoplastics component in the second prepreg material;
      (ii) incorporation of insoluble or partially soluble particles within the second prepreg material;
      (iii) incorporation of insoluble or partially soluble particles between layers of the second prepreg material; and
      (iv) incorporation of one or more strengthening interleafs between layers of the second prepreg material,
      wherein the first prepreg material and the second prepreg material are respectively arranged in contacting relation in a first direction and a second direction.

* * * * *

UNITED STATES PATENT AND TRADEMARK OFFICE
CERTIFICATE OF CORRECTION

PATENT NO. : 8,084,120 B2
APPLICATION NO. : 12/676773
DATED : December 27, 2011
INVENTOR(S) : Samuel Jestyn Hill et al.

It is certified that error appears in the above-identified patent and that said Letters Patent is hereby corrected as shown below:

The Assignee should read "Cytec Technology Corp."

Signed and Sealed this
Twenty-seventh Day of March, 2012

David J. Kappos
*Director of the United States Patent and Trademark Office*